Feb. 17, 1942. M. M. RAYMER 2,273,735
MACHINE FOR FILLING FORMS WITH BISCUIT MATERIAL
Filed May 15, 1939 3 Sheets-Sheet 1
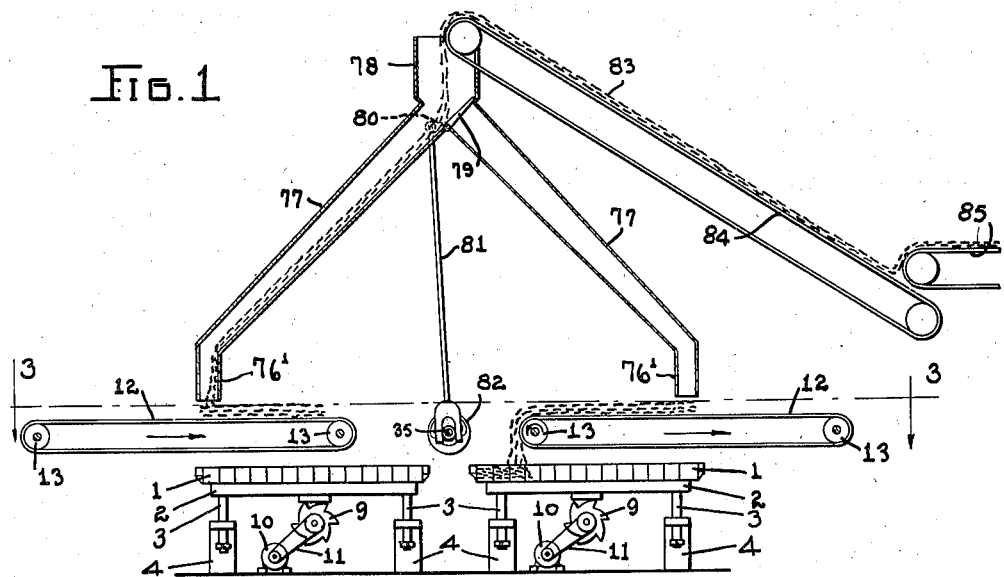
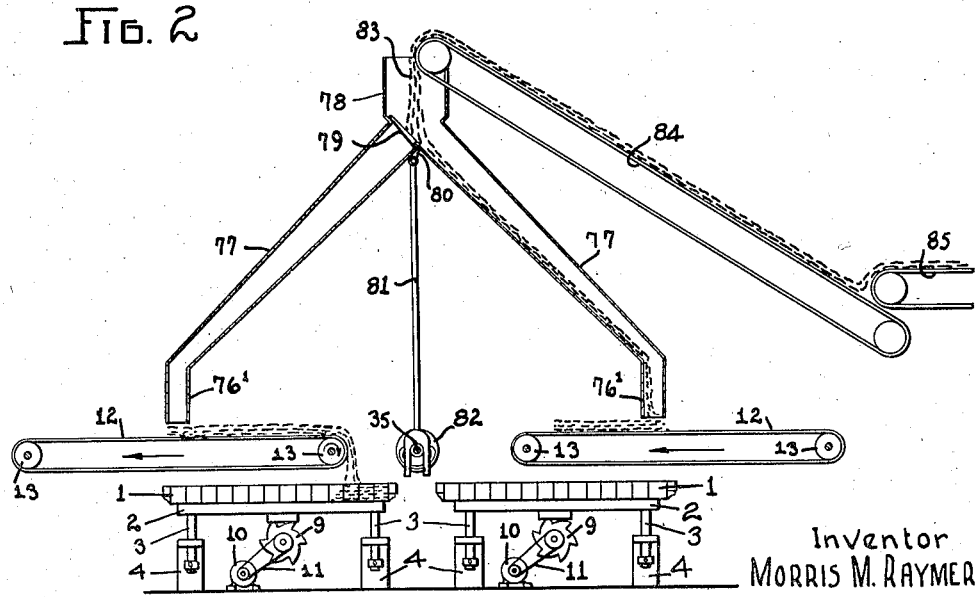
Inventor
MORRIS M. RAYMER
By Toulmin & Toulmin
Attorneys

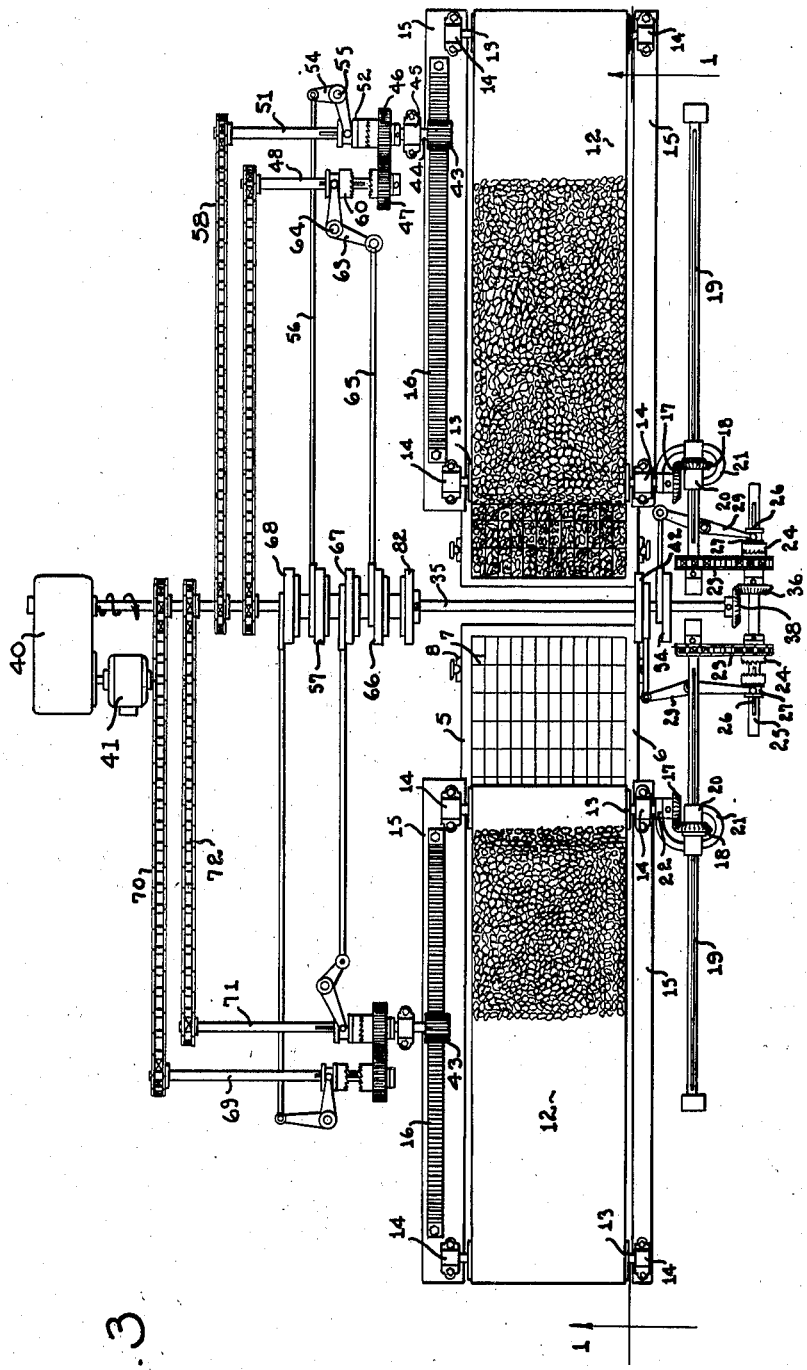

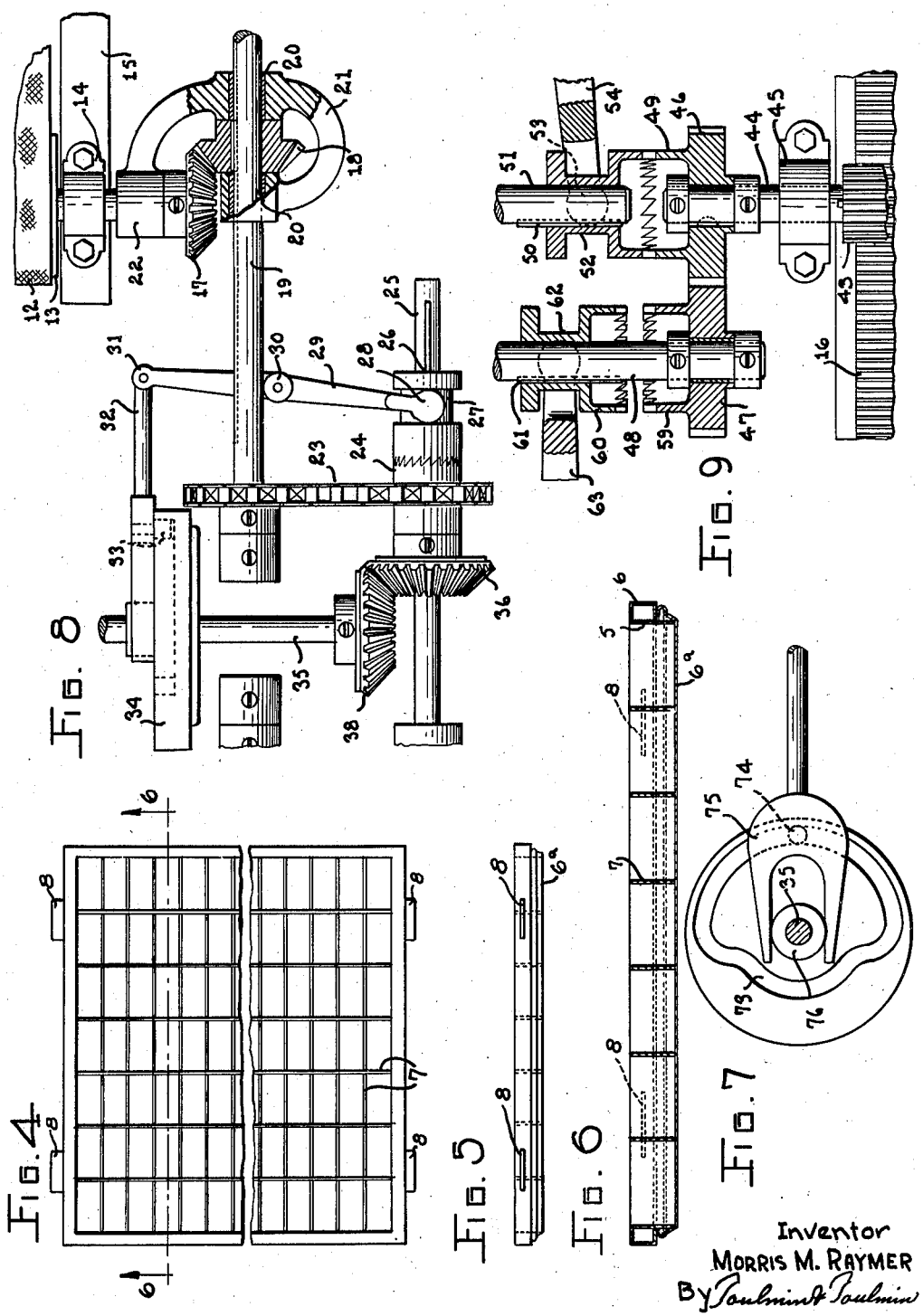

Patented Feb. 17, 1942

2,273,735

UNITED STATES PATENT OFFICE 2,273,735

MACHINE FOR FILLING FORMS WITH BISCUIT MATERIAL

Morris M. Raymer, Augusta, Mich., assignor to Kellogg Company, Battle Creek, Mich., a corporation of Delaware Application May 15, 1939, Serial No. 273,638

12 Claims. (Cl. 226—94)

The present invention relates to machines for filling forms or trays with fluid material such as cereals, sugar, salt, powdered soap, etc. and more particularly with flaked and pressed cereal which is thereafter baked into a biscuit.

In the past, when flaked material containing a high degree of moisture has been placed in forms or trays preparatory to baking, this operation was generally performed by hand. The determination as to whether the forms had received the proper amount of material was left entirely to the judgment of the operator or baker who usually made this determination solely by eye. Consequently, the uniformity with which the forms were filled and the content and weight of the baked product were dependent on the operator's experience and on occasion would vary quite widely.

Moreover, in the case of hand-filling of trays, the filling was slow and tedious, since the operator would have to fill each form separately.

The primary object of the present invention is to eliminate the manual filling referred to hereinbefore and to substitute therefor a machine which not only serves to fill the trays on a quantity production basis and to provide fillings of uniform content, but is also of simple construction, cheap to manufacture and easy to operate. In fact, the machine is practically entirely automatic, except for a slight amount of supervision over its operation.

A more particular object is to distribute a batch of cereal throughout a number of baking forms or trays in order to render uniform the content and weight of each baked unit.

A final object is to provide a machine which handles flaked food stuffs containing a high degree of moisture and eliminates the necessity for any manual handling whatsoever and, therefore, provides complete sanitary conditions.

These objects are attained, in brief, by providing a double unit machine, each unit of which nominally constitutes a half section of the machine and derives its power from a common source and has mechanism which operates through a common cam shaft. Each machine section comprises a pulley-and-belt conveyor arrangement, on which food is deposited from a chute and the said arrangement is adapted to move as a unit over a number of juxtaposed forms from the first row thereof to the last row.

The operation is such that, as the pulley-belt unit is being moved in this manner, the belt is also moved on its pulleys so as continually to present a quantity of food to the edge of the belt in position to be dropped into the forms, as the unit moves across the top thereof. The general arrangement is such that one half of the machine is actually filling the trays with food during one half cycle of operation, while the other half of the machine is receiving food preparatory to dropping the food into the trays during the succeeding half cycle of operation.

Other features and objects will be apparent as the specification is perused in connection with the accompanying drawings in which—

Figure 1 is a diagrammatic view, in elevation, of the improved filling machine, showing the filling of one group of trays, while the belt conveyor of the other group of trays is receiving its charge of food.

Figure 2 is a view similar to Figure 1, except that the trays opposite from those shown in Figure 1 are being filled, while the conveyor belt of the other group of trays is receiving its charge of food.

Figure 3 is a plan view, looking along line 3—3 in Figure 1 in the direction of the arrows.

Figure 4 is a plan view of a frame adapted to receive a group of trays.

Figure 5 is an elevational view of the frame shown in Figure 4.

Figure 6 is a cross sectional view taken along line 6—6 in Figure 4.

Figure 7 is a plan view of a typical form of cam and follower which have been found useful in operating the machine.

Figure 8 is an enlarged plan view, partly in section, of the mechanism shown at the lower portion of Figure 3, and which mechanism operates the conveyor belt drive.

Figure 9 is a plan view, partly in section, of the mechanism shown to the extreme right or left of Figure 3 and employed for operating the rack-pinion mechanism which moves the conveyor belt and pulleys as a unit.

Referring more particularly to Figures 1 and 2, a plurality of groups (two as shown) of trays 1 is supported on a table 2 provided with upright standards 3 which are slidably supported in pedestals 4. The trays 1 may be carried in a frame similar to that shown in Figures 4 and 5. This frame consists simply of a rectangular form 5 with a bottom 6a and having extending transversely and longitudinally thereof a number of partitions 7 which serve as individual compartments for the baking trays or pans (not shown). These pans may be of any suitable and well-known type, having a hollow rectangular configuration and closed at the bottom to receive the food to be baked. Each pan is inserted in an individual compartment. The frame may be provided with a hollow rim 6 of rectangular configuration which preferably extends around the entire length of the frame and conveniently serves as a handle. Projecting from the opposite sides of the frame, there are a number of ledges 8 for guiding and supporting the tray frame in an oven, and also for clamping the tray in the machine.

Referring again to Figures 1 and 2, the frame which is filled with trays is held on the uprights 3 above the pedestals 4 by means of a notched wheel 9, which is adapted to rotate in a direction opposite from the direction of the notches. A motor 10 and belt 11 are provided to rotate the wheel which then serves to jiggle the table 2 and thus shake the contents of each tray contained in the respective frames.

Directly over each tray there is a belt conveyor 12 carried by a pair of pulleys 13. This belt preferably has the same width as the width of the frame 1. The pulleys are journaled at 14 (Figure 3) to a pair of horizontal supports 15 which carry along their upper edge a rack 16. The inner pulley shaft of each unit is extended and terminates in a miter gear 17 which meshes with a gear 18 carried on a splined shaft 19. A pair of bearings 20 are provided in a curvilinear frame 21 which provides a bearing 22 on the pulley shaft. The shaft 19 is provided with a sprocket (not shown), which is driven by a chain 23 carried on a combined sprocket and jaw clutch 24. The sprocket portion of the clutch, as seen more clearly in Figure 8, is carried loosely on a shaft 25, while the engaging portion of the clutch is keyed, as at 26, to the shaft. This last-mentioned portion is provided with a groove 27, in which travels a roller or a rounded end portion 28 of a lever 29 pivoted at 30. The other end 31 of the lever 29 is pivoted through a connecting rod 32 and roller 33 to a slotted cam 34. This cam is carried on a shaft 35 which serves as a main shaft for both halves of the machine.

The shaft 25 is given a rotative effort by a miter gear 36 which meshes with a similar gear 38 keyed to the shaft 35. The latter is rotated continually in any suitable manner and, as illustrated, is coupled through a gear box 40 to an electric motor 41.

It is apparent that, as the shaft 35 is rotated, this rotative motion is carried through the bevel gears 38, 36, to the shaft 25, and from thence to the righthand portion (of the righthand half section of the machine) of the combined jaw clutch mechanism 24. The latter is adapted to slide on the shaft and the design of the cam 34 is such as to move this portion along the splined shaft and intermittently to mesh with the teeth on the other portion of the clutch. Thus, the rotary effort is transmitted through the sprocket and chain 23 to the shaft 19 and from thence through the gears 18 and 17 to the belt shaft. The time relation during which the jaw clutch is engaged, as explained above, with respect to the operation of the rest of the machine will be pointed out when the complete cycle of operation is described.

It will be noted that the lefthand half of the machine, as illustrated in Figure 3, is provided with a conveyor belt and similar mechanism for operating the same from the main shaft 35, the only difference being that the reciprocatory motion of the sliding jaw clutch 24 is obtained through a separate cam 42. As will be explained hereinafter, the cams 34 and 42 operate their respective mechanism during alternate periods of time. The gear arrangement is such that, when the belt pulleys are being rotated, the upper length of belt is caused to move toward the middle of the machine, i. e., the driving pulley of the righthand belt rotates counterclockwise and the corresponding pulley of the lefthand belt rotates clockwise.

In addition to providing a mechanism for moving the conveyor belts on their respective pulleys or shafts, I also provide mechanism for reciprocating the belt and pulleys as a unit across the top of the trays. For this purpose, there is provided at each side of the machine, a pinion 43 which is adapted to mesh with the rack 16 and is carried on a shaft 44. The details of this mechanism are shown more clearly in Figure 9. This shaft is journaled in a bearing 45 secured to the frame of the machine and has keyed thereto at one end a gear 46 which meshes with a gear 47. The latter idles on a shaft 48. The gear 46 constitutes one part of a jaw clutch mechanism indicated at 49, the other portion of which is secured as at 50 to a shaft. This last-mentioned portion is adapted to slide along the shaft 51 and is provided with a groove 52 which receives the rounded end portion 53 forming the terminus of a bell crank lever 54. The latter is pivoted at 55 (Figure 3) and is pivotally connected through a rod 56 to a roller (not shown) which rides in a cam 57. The latter is keyed to the main cam shaft 35.

As the cam 57 is rotated, the rod 56 is given a reciprocatory movement, causing the lever 54 to move the slidable portion 52 of the jaw clutch along the shaft 51 and thus periodically to engage the portion 49 of the clutch. The portion 52 of the clutch is given a continually rotary movement through the shaft 51 by a sprocket-and-chain mechanism 58 which is carried back to the main shaft 35. Thus, the cam 57 is adapted to cause the pinion 43 to rotate in the rack 16 and, as the pinion is given a counterclockwise direction, as indicated by the arrow, the belt and its pulleys are moved as a unit to the right, across the top of the trays.

The gear 47 is employed for moving the belt and pulleys as a unit to the left. The latter is, therefore, given a reciprocatory movement. The movement to the left is obtained through a mechanism which operates similarly to the other mechanism just described, except it serves to rotate the pinion 43 in the opposite direction when actuated by a separate cam. The gear 47 forms part of a jaw clutch indicated at 59 (Figure 9), the teeth of which are adapted to mesh with the teeth on the slidable portion of the clutch indicated at 60. The latter is keyed to the shaft at 61, but is adapted to slide along the shaft. The portion 60 is provided with a groove 62 which receives the rounded end portion of the bell crank lever 63 (Figure 3) pivoted at 64 and carrying at its opposite end a connecting rod 65. This rod is provided with a roller (not shown) which rides in a groove of a cam 66 secured to the main shaft 35.

The design of the cam 66 is such that it periodically reciprocates the connecting rod 65 which causes the portion 60 of the jaw clutch to slide along its shaft 48 and to engage the clutch portion 59 and thus transmit rotary effort to the gear 47. It will be noted that the gear 47 is adapted to rotate the gear 46 in a direction opposite to which it previously had and thus is adapted to reverse the directional rotation of the pinion 43 and cause the belt and its pulleys to move as a unit in the opposite direction from that which it had previously.

It will be noted that the shaft 35 is being continually rotated. The designs of the cams 34, 57 and 66 are such that the conveyor belt 12 and its pulleys are first moved as a unit inwardly toward the center of the machine, i. e., toward the shaft 35 by the operation of the cam 66. After the inner edge of the belt reaches the end of its longitudinal travel and is directly above the inner edge of one group of trays, the cam 57 operates to reverse the rotation of the pinion 43 to cause the belt and pulleys to move as a unit in the opposite direction, i. e., away from the shaft 35. At the same time, the cam 34 operates to rotate the belt 12 on its pulleys, causing the upper layer of belt to move toward the center of the machine at such a velocity that a given point on the belt will remain stationary in space due to the combined momevent of the belt on its pulleys in one direction and the lingitudinal movement of the belt and pulleys as a unit in the opposite direction.

As stated hereinbefore, each side of the machine is composed of similar mechanism except that the operating parts are taken through different cams on the main shaft. Thus, the cam for operating the belt pulleys on the lefthand side of the machine, as seen in Figure 3, is indicated at 42. The cam for moving the belt conveyor and pulleys as a unit toward the shaft 35 is indicated at 67, and the cam for retracting this unit is indicated at 68. The shaft 69 which corresponds to the shaft 51 on the righthand side of the machine is given a continual rotary movement by a chain-and-sprocket arrangement 70. The shaft 71 corresponds in function to the shaft 48 on the other side of the machine and is given a continuous rotation by the sprocket-and-chain arrangement 72.

The design and the timing of the cams 57, 66 and 34 which operate the various reciprocating and rotary mechanism on the righthand side of the machine are such that this mechanism operates alternatively with the corresponding mechanism on the other side of the machine which is actuated by the respective cams 68, 67 and 42. Thus, as the righthand belt and pulleys, as a unit, are being moved toward the shaft 35 by the operation of cam 66, the cams 68 and 42 are operated to move the lefthand belt and the pulleys as a unit away from the shaft 35 and the belt is simultaneously rotated on its pulleys. As pointed out hereinbefore, the belt 12 is rotated in such a direction during this rearward movement of the entire unit that a point on the belt will appear to remain stationary in space since the speed of the rearward movement is equal and in the opposite direction to the speed of the belt on its pulleys.

Similarly, when the righthand belt and pulleys are being retracted away from the shaft 35 by the effort of cam 57 and is also being rotated on its pulleys by the effort of the cam 34, the cam 67 has operated to move the lefthand belt and its pulleys as a unit to the right, i. e., toward the shaft 35. Consequently, the latter shaft can be rotated continuously and some movement, either the reciprocations of the belt and pulley unit or the rotations of the belt on its pulleys or both, takes place at all times in one or the other half of the machine. The motor 41 is, therefore, subjected to a continuous load.

The proper design of cams to effect the recurring operations set forth is well known to those skilled in the art, and further explanation appears unnecessary. Figure 7 shows a suitable design of cam including a slot 73. The follower or roller is indicated at 74. In order to assure a strictly horizontal movement of the various connecting rods, as the follower moves around the slot, the rods may be provided with a plate 75 in the form of a horseshoe, the open end of which fits about a collar 76 on the cam shaft and the other end carries the roller 74 as a pivot. Thus, the axis of the connecting rod is maintained horizontal by the stabilizing effect of the plate 75.

As stated hereinbefore, the belts of each half of the machine are positioned directly above each group of trays. These belts constitute an efficient mechanism, by which the trays are evenly and quickly filled with food which had previously been deposited on the belts. As shown in Figures 1 and 2, each belt is positioned directly under a spout 76', communicating through a chute 77 at the upper end with a common hopper or chute 78. The spout 76' is preferably of rectangular configuration and has a width of substantially the same dimension as the width of the belt 12. The apex of the dual chute arrangement carries a swinging gate or splitter valve 79 which is adapted to close, first, one chute and then the other chute in synchronism with the remainder of the machine. This valve is actuated by a lever 80 connected through a rod 81 to a cam and follower arrangement indicated at 82. The cam is keyed to the main cam shaft 35, as shown in Figure 3. The design and timing of the cam 82 are such that, when the righthand belt and pulley unit has been moved to its extreme righthand position, the valve 79 is moved into the position shown in Figure 2, which permits the cereal or other fluid material indicated at 83 to flow through the righthand chute on to the belt. The splitter valve cam 82 causes the valve 79 to remain in the position shown in Figure 2 during the entire movement inwardly of the righthand belt and pulley unit. Thus, a layer of cereal is applied to the upper surface of the belt during its longitudinal travel and, after the latter has reached its innermost position directly over the inner edge of the trays, the cam 82 serves to swing the valve 79 to its opposite position which is indicated in Figure 1.

At this time, the lefthand belt and its pulleys have been moved in a direction away from the shaft and have now reached the limit of its travel in this direction. Consequently, cereal starts to flow through the lefthand chute on to the lefthand belt which simultaneously starts to move toward the right as the belt on the other side of the machine had done previously. Thus, the belts 12 are alternatively provided with a layer of cereal, depending on the position of the splitter valve 79.

As these belts move alternately toward the shaft 35 and reach their innermost position, the belts are rotated on their pulleys and retracted at the same time. This causes the cereal to travel toward the inner edge of the belt and to drop from the belt into the trays and, since the belt and pulleys are being also retracted as a unit, the position from which the cereal is being dropped will continually move from the first row of trays successively to the last row thereof. If the speed of the belt is exactly equal to the speed of retraction, the cereal layer will, in effect, drop vertically downward into the trays and through the same vertical planes that it had occupied when on the belt. From this, it is apparent that the length of the cereal layer on the belt exactly corresponds to the length of the succeeding rows of trays.

The cereal with which the trays are filled may comprise any type of food which it is desired to place in trays or pans for baking. It has been found that the dual filling machine operates particularly well in those difficult cases in which the cereal constitutes flaked material containing a high degree of moisture, for example, twenty to thirty per cent. Under these circumstances, it was almost impossible to fill a large number of trays manually with any degree of uniformity or speed, whereas the present machine serves to spread the food evenly throughout the trays and at a speed which can be made as high as possible within practical limits.

The table 2 is vibrated as soon as the first row of trays is filled with food and these vibrations continue until the last row of trays has been filled, as the belt-pulley unit moves away from the shaft 35. Any suitable arrangement by which the motor 10 is energized during the necessary period of time may be employed, for example, electrical contacts (not shown) cooperating with suitably positioned relays can be secured to the combined belt and pulley unit so as to start the motor when the unit is at its inner most position and to stop the motor when it has traveled to its outer position immediately after the cereal-delivering operation.

The cereal 83 may be fed into the common hopper 78 in any suitable and well-known manner, for example, an inclined belt conveyor 84 receiving cereal in flaked form from a horizontal belt conveyor 85 may be employed. The latter would serve to convey the cereal from the last processing machine in the line which would normally be a flaking mill.

It is apparent that modifications of the general scheme will occur to those merely skilled in the art. For example, instead of loading the belt 12 only during the longitudinal movement of the belt-pulley unit, it is possible to deposit cereal on the belt by rotating the pulleys and thereafter moving the belt-pulley unit to its food-delivering position immediately over the top of the first row of trays. Another modificaion would be to deposit the cereal on the belt while the pulleys are being rotated and the belt-pulley unit was being simultaneously moved toward the center of the machine.

It is also evident that, whereas I have shown and described a machine constituted of two sections, it is possible to design a machine along the lines described to accommodate three, four or more sections and necessitating a corresponding change in the number of chutes and belt-pulley units. By a proper design of cam on the main cam shaft and the timing thereof, the load on the motor can still be kept substantially uniform even when the sections are of an odd number.

Moreover, instead of employing a notched wheel and motor arrangement for shaking the trays at the predetermined time, other devices may be employed for this purpose, which derive their motion from either electrical energy, mechanical means or from compressed air. The purpose of the vibrator or shaking mechanism 9 is to cause the moistened food contents of the trays to level itself within each tray so that the resulting biscuits will be of uniform thickness.

While I have described the belt 12 and pulleys 13 as moving as a unit over the trays 1 and away from the center of the machine during the filling operation, it is apparent that if desired, mechanism could be provided for moving the trays 1 with respect to the belt pulley unit 12, 13. In such a case, this unit would remain stationary, but the belt would be caused to rotate on the pulleys 13 as the trays were moving underneath the belt.

It will be understood that I desire to comprehend within my invention such modifications as come within the scope of the claims and the invention.

Having thus fully described my invention, what I claim as new and desire to secure by Letters Patent is:

1. In a food-dispensing machine, a food-containing hopper, a conveyor carried on pulleys and adapted to receive food from said hopper, means for moving the conveyor and pulleys as a unit from a position directly over the first row of a plurality of trays to a position directly over the last row of trays, and means for rotating said pulleys to cause the conveyor to move in a direction opposite from the direction in which the conveyor-pulley unit moves, whereby food on the conveyor is maintained at a position over the trays such as to drop food progressively and evenly into the trays from the first to the last row thereof, the rate of said movements being substantially equal whereby the food remains stationary in space and in a position to drop substantially vertically downward from the conveyor into the trays as the conveyor-pulley unit moves over the trays.

2. In a food-dispensing machine, a food-containing hopper, means for selectively feeding food to each group of a plurality of groups of trays disposed horizontally and in juxtaposition, said means including a separate device for holding food in position over each group of trays and over each row of trays in succession, means for moving said device successively over each group of trays, and means for causing the food-holding device to drop the food continuously into the trays as said device moves over its group of trays.

3. In a food-dispensing machine, a food-containing hopper, means for selectively feeding food to each group of a plurality of groups of trays disposed horizontally and in juxtaposition, said means including separate devices for holding food in position over each group of trays and over each row of trays in succession, each of said devices being adapted to move over its group of trays, means for causing each food-holding device to drop the food continuously into the trays as each device moves over its group of trays, and means for shaking the trays as food is being dropped therein.

4. In a food dispensing machine, a food-containing hopper, means for selectively feeding food to each group of a plurality of groups of trays disposed horizontally and in juxtaposition, said means including a conveyor belt carried on pulleys, each belt being adapted to receive food selectively from the hopper, and means for causing the food on each belt to drop into the respective group of trays, said last-mentioned means comprising means for rotating said pulleys.

5. In a food-dispensing machine, a food-containing hopper, a plurality of chutes leading from the hopper to a plurality of horizontally disposed trays arranged in a plurality of groups, means including a moving belt positioned at each group for selectively receiving the food from the respective chutes and for distributing the food evenly and successively over each group of trays.

6. In a food-dispensing machine, a food-containing hopper, a pair of chutes leading from the hopper to a pair of groups of trays, means including a moving conveyor in each group for receiving food from said hopper and for distributing the food evenly over the trays of the group, one of said means operating during one-half cycle of operation, and the corresponding means of the other group operating independently of the other of said means during the other half of the cycle.

7. In a food-dispensing machine, a food-containing hopper, means for selectively feeding food to each group of a plurality of groups of horizontally disposed trays, said means including a conveyor belt carried on pulleys, means for selectively depositing on each belt food received from the hopper, and means including a pulley-rotating device for causing the deposited food to be dropped from each belt into the respective groups of trays, said food-depositing means and said pulley-rotating device belonging to both groups of trays being actuated through cams from a common cam shaft.

8. In a food-dispensing machine, a food-containing hopper, a plurality of chutes leading from the hopper to each group of a plurality of groups of horizontally disposed trays, means including a moving belt positioned at each chute for selectively and directly receiving the food from the respective chutes and for distributing the food evenly over each group of trays, said last-mentioned means including a plurality of cams for initiating the actuation of the belts at the groups of trays and driven by a common cam shaft.

9. In a food-dispensing machine, a food-containing hopper, a plurality of chutes leading from the hopper to each group of a plurality of groups of horizontally disposed trays, means positioned at each group for selectively receiving the food from the respective chutes, said means comprising a conveyor belt mounted on pulleys, means for moving the belt and pulleys as a unit under its respective chute to receive the food, means for moving the belt with respect to its pulleys in order to drop the food from each belt into the respective groups of trays, and means for simultaneously moving the belt and pulleys as a unit in a direction opposite from the direction the unit had when the belt was receiving food from its chute, whereby each group of trays is filled uniformly with food from the first row to the last row thereof, all of said movements being of an intermittent character and alternating with the similar movements of the corresponding means provided for another group of trays.

10. In a food-dispensing machine, a food-containing hopper, a plurality of chutes leading from the hopper to each group of a plurality of groups of horizontally disposed trays, means positioned at each group for selectively receiving the food from the respective chutes, said means comprising a conveyor belt mounted on pulleys, means for moving the belt and pulleys as a unit under its respective chute to receive the food, means for moving the belt with respect to its pulleys in order to drop the food from each belt into the respective groups of trays, and means for simultaneously moving the belt and pulleys as a unit in a direction opposite from the direction the unit had when the belt was receiving food from its chute, whereby each group of trays is filled uniformly with food from the first row to the last row thereof, all of said movements being of an intermittent character and alternating with the similar movements of the corresponding means provided for another group of trays, said movements being obtained from cams secured to a common cam shaft which is adapted continually to be rotated.

11. In a food-dispensing machine, means for conveying food selectively to a plurality of chutes, and means including moving belts on which the food is deposited from said chutes, said belts serving to distribute the food evenly over a plurality of horizontally disposed trays, said conveying means including a splitter valve for selectively controlling the delivery of food to said chutes.

12. In a food-dispensing machine, means including a main chute for conveying food selectively to a pair of auxiliary chutes, means including moving belts on which the food is deposited from said chutes, said belts serving to distribute said food evenly over a plurality of horizontally disposed trays, said selective means including a splitter valve positioned in said main chute and adapted alternately to open and close the passageway to each of said auxiliary chutes.

MORRIS M. RAYMER.